United States Patent
Watanabe et al.

(10) Patent No.: US 7,761,510 B2
(45) Date of Patent: Jul. 20, 2010

(54) CONFERENCE SYSTEM FOR ENABLING CONCURRENT DISPLAYING OF DATA FROM CONFERENCE PRESENTER AND CONFERENCE PARTICIPANTS

(75) Inventors: Yoshiki Watanabe, Kanagawa (JP);
Kazunori Horikiri, Kanagawa (JP);
Katsuya Mitsutake, Kanagawa (JP);
Yoshihiro Masuda, Kanagawa (JP);
Masatomi Inagaki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 592 days.

(21) Appl. No.: 11/552,155

(22) Filed: Oct. 24, 2006

(65) Prior Publication Data
US 2007/0244970 A1 Oct. 18, 2007

(30) Foreign Application Priority Data
Apr. 11, 2006 (JP) ............................. 2006-108327

(51) Int. Cl.
*G06F 15/16* (2006.01)
(52) U.S. Cl. ..................... 709/204; 348/14.08; 704/9
(58) Field of Classification Search .................. 709/204
See application file for complete search history.

(56) References Cited

U.S. PATENT DOCUMENTS

| | | | |
|---|---|---|---|
| 5,465,370 A | 11/1995 | Ito et al. | |
| 5,694,544 A | 12/1997 | Tanigawa et al. | |
| 6,374,209 B1 * | 4/2002 | Yoshimi et al. | 704/9 |
| 6,421,706 B1 * | 7/2002 | McNeill et al. | 709/204 |
| 2003/0071850 A1 * | 4/2003 | Geidl | 345/781 |
| 2003/0117486 A1 * | 6/2003 | Ferren et al. | 348/14.08 |

FOREIGN PATENT DOCUMENTS

EP 0497022 4/1999

(Continued)

OTHER PUBLICATIONS

Notice To Submit Argument from the Korean Patent Office in corresponding Korean Patent Application Serial No. 10-2006-0128699; Moon et al., Electronic Conferencing System, with English translation.
Office Action issued on May 27, 2008 from the Korean Patent Office for related Korean Patent Application Serial No. 10-2006-0128699, with English translation.

(Continued)

*Primary Examiner*—Firmin Backer
*Assistant Examiner*—Tobias J Casaw
(74) *Attorney, Agent, or Firm*—Gauthier & Connors LLP

(57) ABSTRACT

A conference system includes a terminal that displays a document presented by a presenter in a conference and that is capable of receiving writing inputs from a participant for enabling exchange of opinions, and a document storage unit that stores the document used in the conference and the written information. The document storage unit stores image data of respective pages of the document, shared overwrite data for each page including shared written information written by the presenter or participants, and personal overwrite data for each participant provided for each page and including personal memo information written by the participant. The terminal includes a read unit that selectively reads out from the document storage unit, concerning each page, the image data of the presented document, the shared overwrite data, and a participant's personal overwrite data, and a display controller that overlaps the read-out data and displays the overlapped data on a display.

4 Claims, 15 Drawing Sheets

FOREIGN PATENT DOCUMENTS

| | | |
|---|---|---|
| JP | 5300147 | 11/1993 |
| JP | 7105105 | 4/1995 |
| JP | 11073174 | 3/1999 |
| JP | 2003009107 | 1/2003 |
| WO | 2005029739 | 3/2005 |

OTHER PUBLICATIONS

Office Action issued on Mar. 19, 2008 from the Australian Patent Office for corresponding Australian Patent Application No. 2006233222.

* cited by examiner

| PAGE ID | MULTILAYER DOCUMENT ||||| 
| --- | --- | --- | --- | --- | --- |
| ^ | COMPILED PAGE | ORIGINAL DOCUMENT | SHARED OVERWRITE LAYER | FIRST PERSONAL OVERWRITE LAYER | SECOND PERSONAL OVERWRITE LAYER |
| 2005090501320 | 1 | W, M | W, M | W | W |
| 2005090501321 | 2 | W, M | | | W, M |
| 2005090501322 | | W | | W | |
| 2005090501323 | | W | W, M | | |
| 2005090501324 | 3 | W, M | | W, M | |
| 2005090501325 | 4 | W, M | | | W, M |

PATENT DISCUSSION CONFERENCE JOB: PARTICIPANT A

W=Write   M=Mark

Fig. 17

CONFERENCE SYSTEM FOR ENABLING CONCURRENT DISPLAYING OF DATA FROM CONFERENCE PRESENTER AND CONFERENCE PARTICIPANTS

PRIORITY INFORMATION

This application claims priority from Japanese Patent Application No. 2006-108327, filed on Apr. 11, 2006.

BACKGROUND

1. Technical Field

The present invention relates to a conference system, and particularly to a conference system including a conference terminal, a method for controlling a conference system, and a control program for a conference terminal.

2. Related Art

With the recent enhancements in performance of personal computers (hereinafter referred to as "PC"), developments in networks, and widespread uses of devices such as large-size displays and digital cameras, conference systems are now widely used for holding a remote conference in which at least two remote locations are connected via a network so as to share audio and image information between those two locations. A conference system typically includes input units such as a camera and a microphone for inputting image and audio information into each terminal such as a PC, and output units such as a large-size display and a speaker.

SUMMARY

A conference system according to an aspect of the present invention includes a terminal that displays a document presented by a presenter in a conference and that is capable of receiving writing inputs from a participant of the conference for enabling an exchange of opinions between participants, and a document storage unit that stores the document used in the conference and the written information. The document storage unit stores image data of respective pages of the presented document, shared overwrite data provided for each page and including shared written information written by the presenter or other participants, and personal overwrite data for each participant provided for each page and including personal memo information written by the participant. The terminal includes a read unit that selectively reads out from the document storage unit the image data of each page of the presented document, the shared overwrite data for each page, and a participant's personal overwrite data for each page. The terminal further includes a display controller that overlaps the data read out by the read unit and displays the overlapped data on a display.

BRIEF DESCRIPTION OF THE DRAWINGS

An embodiment of the present invention will be described in detail based on the following figures, wherein:

FIG. 17 shows a specific data list of the multilayer document indicating information selected.

DETAILED DESCRIPTION

Figure 1:
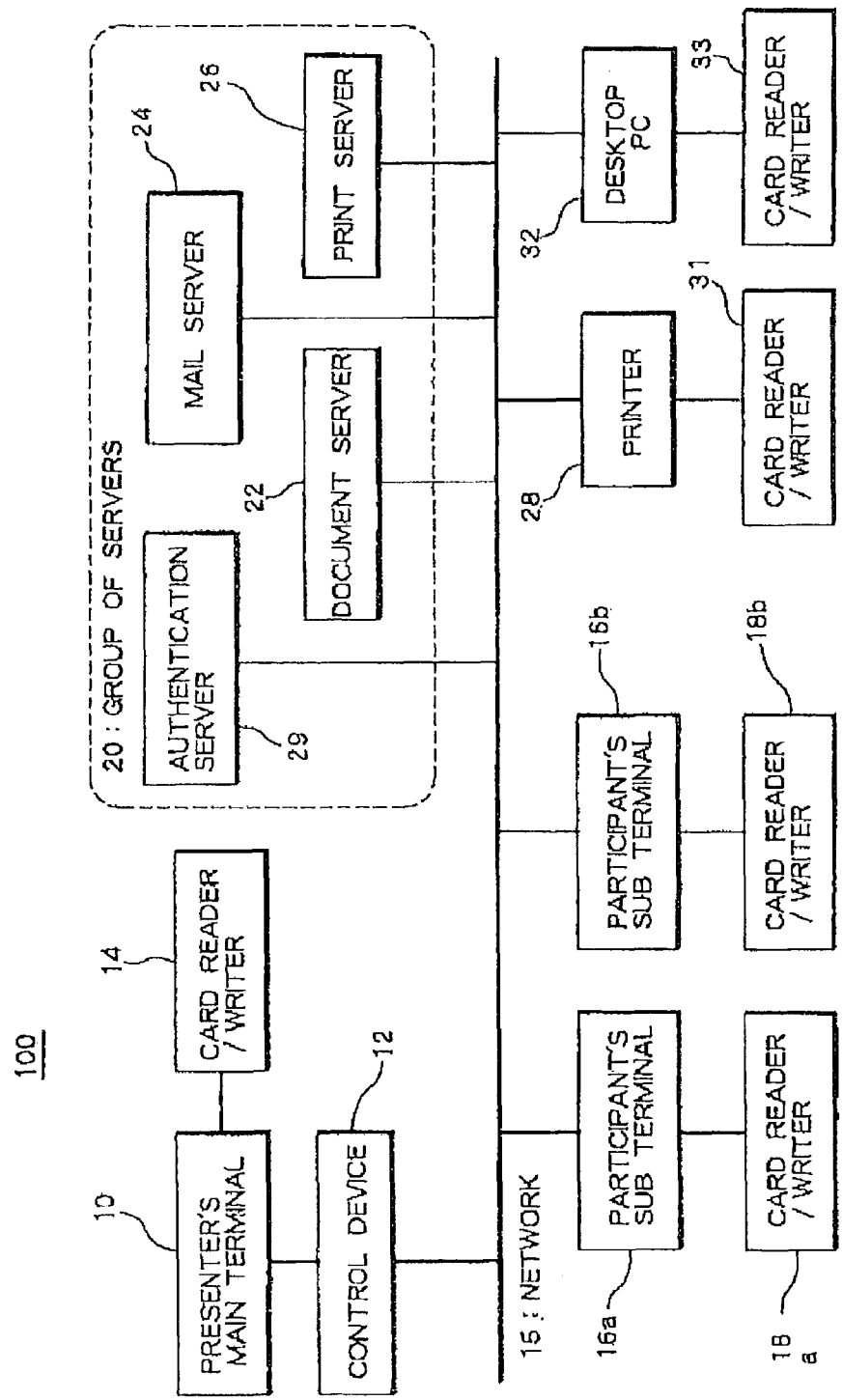
FIG. 1 is a diagram showing the overall configuration of a conference system according to an exemplary embodiment of the present invention.

An exemplary embodiment of the present invention will next be described referring to the drawings.

Figure 2:
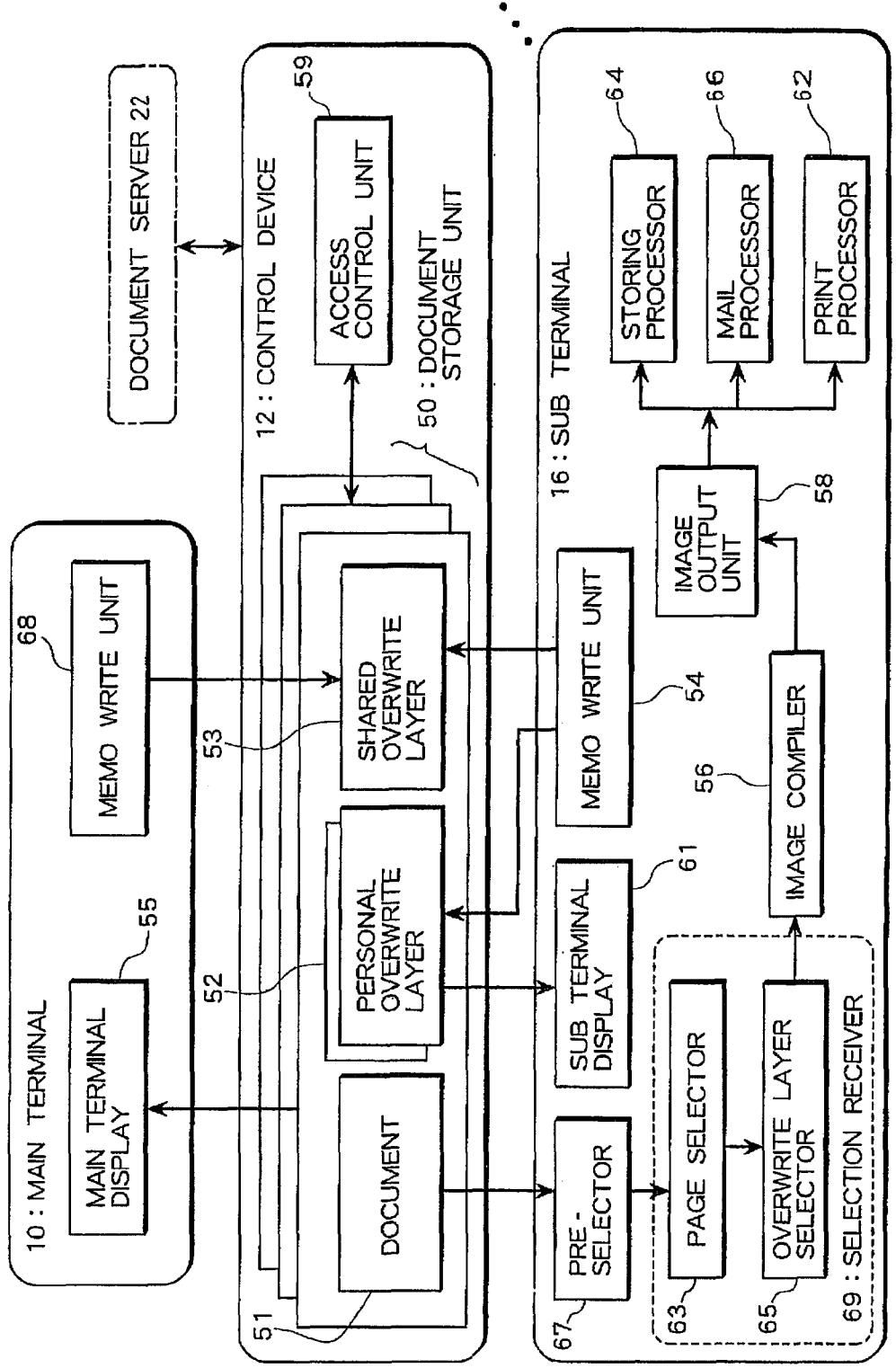
FIG. 2 is a block diagram showing control processing of the conference system according to the exemplary embodiment.

An outline of a conference system 100 is illustrated using the overall configuration diagram of FIG. 1 and the control processing block diagram of FIG. 2. The conference system 100 can be described by dividing into four major sections. The first section includes a main terminal 10 for conducting a presentation and a control device 12. The second section includes sub terminals 16a, 16b for viewing and listening to the presentation. The third section includes a group 20 of servers for managing electronic documents such as the document presented in a conference. The fourth section includes auxiliary facilities such as a printer 28 for printing a document and a desktop PC 32 that can be used in substitution for a sub terminal 16. All of the above-noted sections are connected via a network 15.

The group 20 of servers includes an authentication server 29, document server 22, mail server 24, and a print server 26. Further, IC card reader/writers 14, 18a, 18b, 31, 33 provided for preventing information leakage are connected to the main terminal 10, sub terminals 16a, 16b, printer 28, and desktop PC 32, respectively.

The functions of each server are as described below. The authentication server 29 is a server that manages information concerning security and authenticates presenters and participants. The document server 22 is a server that manages electronic documents such as a presented document and a document with added memos. The mail server 24 is employed for transmission and reception of electronic documents. The print server 26 is used for printing electronic documents. By employing the conference system 100, it is possible to smoothly conduct processing ranging from management of a document required in a conference to management, printing, to transmission of an electronic document that was used in a conference.

FIG. 2 shows control processing blocks having the functions for displaying a document in the main terminal 10 and the sub terminal 16, for receiving writing inputs of memos from the respective terminals, and for selectively reading out the document and the memos.

The control device 12 includes an access control unit 59 that acquires a document to be used for a presentation from the document server 22 and stores the acquired document in a document storage unit 50. The access control unit 59 controls acquisition of documents, transmission of documents to the main terminal 10 and the sub terminal 16, and accesses such as writing inputs from the main terminal 10 and the sub terminal 16.

The main terminal 10 includes a main terminal display 55 for displaying a document acquired from the control device 12, and a memo write unit 68 for writing memos into a document.

The sub terminal 16 includes a sub terminal display 61 for displaying a document acquired from the control device 12, a memo write unit 54 for writing memos into a document, as well as a pre-selector 67, selection receiver 69, image compiler 56, and image output unit 58 that make it possible to selectively extract the written memos.

The selection receiver 69 of the sub terminal 16 includes a page selector 63 and overwrite layer selector 65 for receiving instructions from a participant. The image output unit 58 includes, as output processors, a storing processor 64 for storing an image into the document server 22, a mail processor 66 for transmitting an image to the mail server 24, and a print processor 62 for transmitting an image to the print server 26.

The document storage unit 50 controlled by the access control unit 59 contains a document 51, shared overwrite layer 53, and personal overwrite layer 52. The personal overwrite layer 52 includes a plurality of personal overwrite layers (memo data memory regions) for the respective participants, the details of which are described later. An electronic document including a document 51, personal overwrite layer 52, and shared overwrite layer 53 is hereinafter referred to as a multilayer document.

An outline of the control processing is next described referring to the control processing block diagram of FIG. 2. When a presenter makes a presentation of contents of a document, the document to be presented is acquired from the document server 22 via the network 15 and stored into the document storage unit 50 within the control device 12.

A multilayer document including the document 51 stored in the document storage unit 50 is transmitted by the access control unit 59 simultaneously to the main terminal display 55 and the sub terminal display 61, and is displayed on those displays 55 and 61.

While the access control unit 59 is in the state of permitting writing inputs, when the presenter inputs memos into the main terminal 10, the input memos are recorded in the shared overwrite layer 53 by the memo write unit 68. Further, when a participant inputs memos via the sub terminal 16, the input memos are recorded in either of the shared overwrite layer 53 or the personal overwrite layer 52 by the memo write unit 54.

FIG. 2 also shows processing related to document consolidation performed by the sub terminal 16 after the close of the conference. The pre-selector 67 reads out the number of strokes, bit map data size, or the like of each memo recorded in the document storage unit 50, and selects memos having a value exceeding a predetermined threshold value as candidates. By performing this processing, memos that should be extracted are selected from among all memos.

The page selector 63 acquires the memo candidates from the pre-selector 67, and receives an input indicating a page selected by a participant. Subsequently, the overwrite selector 65 receives from the participant a selection of at least one of the personal overwrite layer 52 and the shared overwrite layer 53 for each page to be extracted. By performing these procedures, the pages and layers to be extracted are determined.

The image compiler 56 compiles each page and its layer selected by means of the above-described selectors, to thereby generate a compiled page. The image output unit 58 outputs the compiled page generated based on the participant's output instruction which was input via the sub terminal 16 to at least one of the print processor 62, mail processor 66, and storing processor 64.

By configuring the control device 12 to store electronic documents as described above, communications traffic between the respective terminals and the group of servers can be reduced, thereby reducing the response time generated at the respective terminals. The control device 12 can also provide control for supporting the progression of discussions in the conference by means of the access control unit which is capable of controlling access to the document storage unit 50 in accordance with instructions from the presenter.

Figure 3:
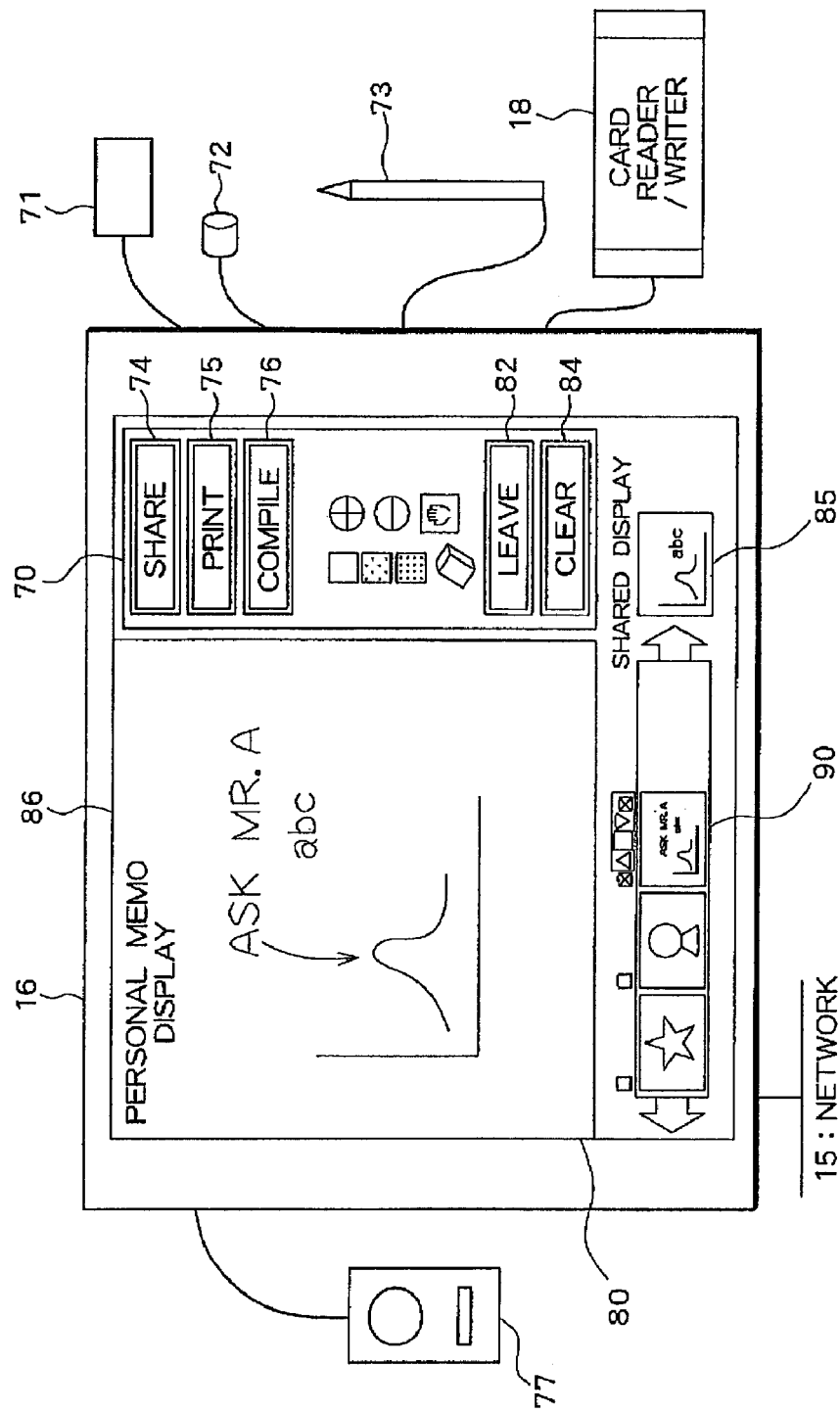
FIG. 3 is an image diagram showing a configuration and screen image of a conference sub terminal according to the exemplary embodiment.

FIG. 3 shows a configuration of the above-described sub terminal 16 and its screen image showing a user interface. The sub terminal 16 is an electronic pen input type computer to which no keyboard is connected, and includes a screen 80, camera 71, microphone 72, electronic pen 73, speaker 77, and IC card reader/writer 18.

The screen 80 of the sub terminal 16 is divided into an operation area 70, reduced display area 85, enlarged display area 86, and thumbnail display area 90. The operation area 70 includes a share button 74, print button 75, compile button 76, leave button 82, and clear button 84. The functions of the respective buttons are described later.

The "personal memo display" displayed in the enlarged display area 86 in FIG. 3 is an example in which a page of the original document and the personal overwrite layer 52 are displayed in an overlapping manner. The "shared display" displayed in the reduced display area 85 is an example in which a page of the original document and the shared overwrite layer 53 are displayed in a similar overlapping manner.

The reduced display area 85 and the enlarged display area 86 in FIG. 3 may be configured such that, for example, by double-clicking the reduced display area 85 currently showing the "shared display" by means of the electronic pen 73, the displayed contents in the reduced display area 85 and the enlarged display area 86 are replaced with one another, such that the "shared display" and the "personal memo display" are switched. With this function, the participant can freely switch the screen displays during the conference.

Figure 4:
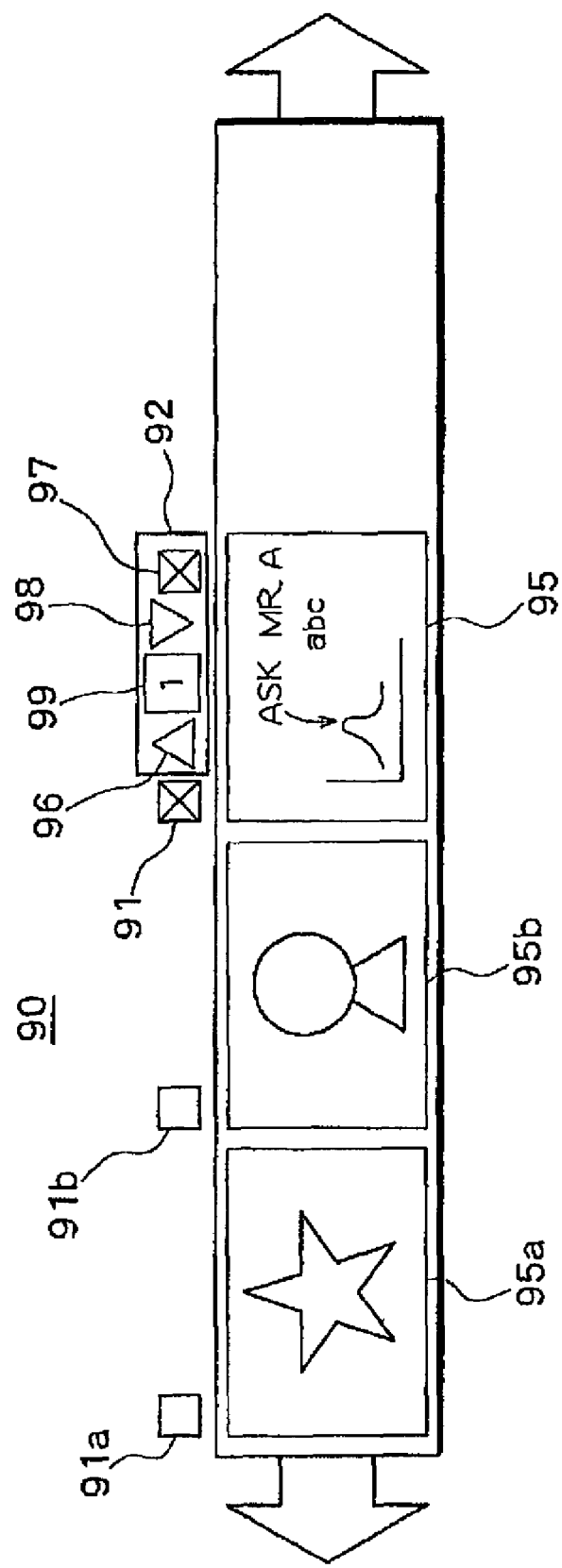
FIG. 4 is an image diagram showing an enlarged view of a thumbnail display area in the exemplary embodiment.

FIG. 4 shows an enlarged view of the thumbnail display area 90 which indicates an example display of a multilayer document stored in the above-described document storage unit 50. The thumbnail display area 90 includes thumbnails 95 which are reduced screens, page selection check boxes 91 which are selectable, and an overwrite layer switching sub panel 92 which is displayed when the participant selects a page selection check box 91.

The overwrite layer switching sub panel 92 includes a count-up button 96, count-down button 98, number display window 99, and overwrite layer selection check box 97.

When the participant clicks a page selection check box 91 to place a checkmark therein, the overwrite layer switching sub panel 92 is displayed. The participant can select either of the "personal memo display" or the "shared display" by operating the overwrite layer switching sub panel 92 of the thumbnail display area 90. Further, by double-clicking a thumbnail 95, the image in the thumbnail can be displayed in the enlarged display area 86.

The number displayed in the number display window 99 is the number assigned to each layer of the multilayer document. The image in the thumbnail 95 can be changed by means of the count-up button 96 and the count-down button 98.

Figure 5:
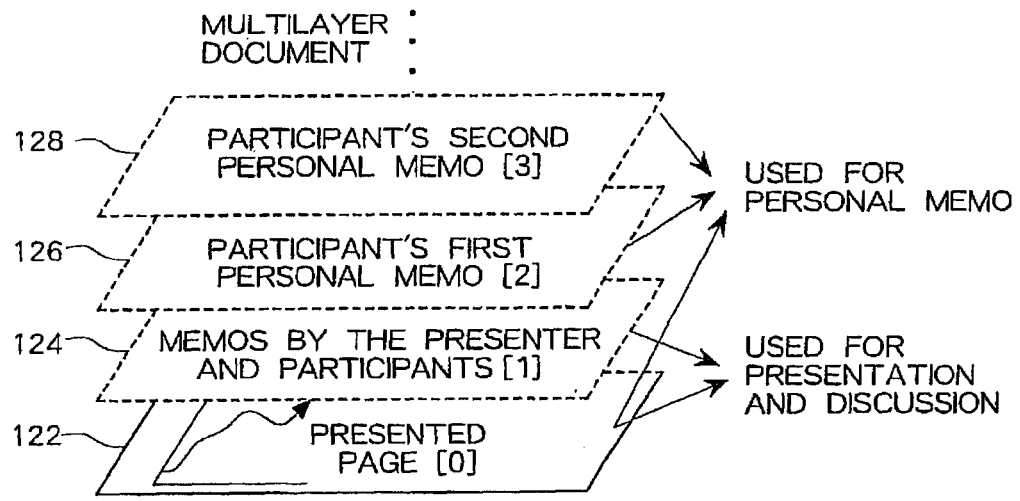
FIG. 5 is a diagram explaining the relationship between the original document and the overlapping layers in a multilayer document according to the exemplary embodiment.

FIG. 5 shows a multilayer document formed by overlapping on the original document a single shared overwrite layer and two personal overwrite layers assigned to each participant. The multilayer document includes an original document page [0] 122, shared overwrite layer page [1] 124, first personal overwrite layer page [2] 126, and second personal overwrite layer page [3] 128. Each layer is assigned with a number [n] such that each layer can be selected individually. [n] shows the layer number assigned to each layer.

The original document page [0] 122 and the shared overwrite layer page [1] 124 are used for the presentation and discussion. On the other hand, the original document page [0] 122, first personal overwrite layer page [2] 126, and second personal overwrite layer page [3] are employed as the memo data storage region for personal memos.

By configuring the document in multilayer form as described above, it is possible to employ the document in different forms such as the presented original document alone, a combination of the original document and the personal overwrite layer, a combination of the document 51 and the shared overwrite layer 53, and a combination of the document 51, the personal overwrite layer 52, and the shared overwrite layer 53.

For example, when [1] is displayed in the number display window 99 of FIG. 4, the original document page [0] 122 and the shared overwrite layer page [1] 124 are overlapped and displayed. It may be possible to select [*] (wild card) not showing any number in order to display all layers.

The number display window 99 can display the layer numbers from [0] indicating the original document page 122 to [3] indicating the second personal overwrite layer 128. By placing a checkmark in the overwrite layer selection check box 97 while a number is displayed, it is possible to individually select each layer.

The thumbnail display area 90 provides a reduced display of images in a scrollable state. With this arrangement, a series of images used in the conference can be easily viewed. When no checkmark is placed in the page selection check box 91, the overwrite layer switching sub panel 92 is not displayed, such that memos can not be selected. The overwrite layer switching sub panel 92 is configured to also serve as an indicator for showing to the participant which layers of memos are written for the selected page.

When memos are written for a page and no checkmark is placed in the page selection check box 91, the page image including all its layers of memos is displayed in the thumbnail 95.

Further, when the overwrite layer selection check box 97 is pressed for an extended duration such as three seconds, all layers including the shared overwrite layer and the first and second personal overwrite layers are selected. With this function, the participant can easily select all memos written in the respective layers. When the participant wishes to clear an incorrect selection of layers, the overwrite layer selection check box 97 may be pressed again for the extended duration so as to clear the layer selection by means of a history function (not shown).

Figure 16:
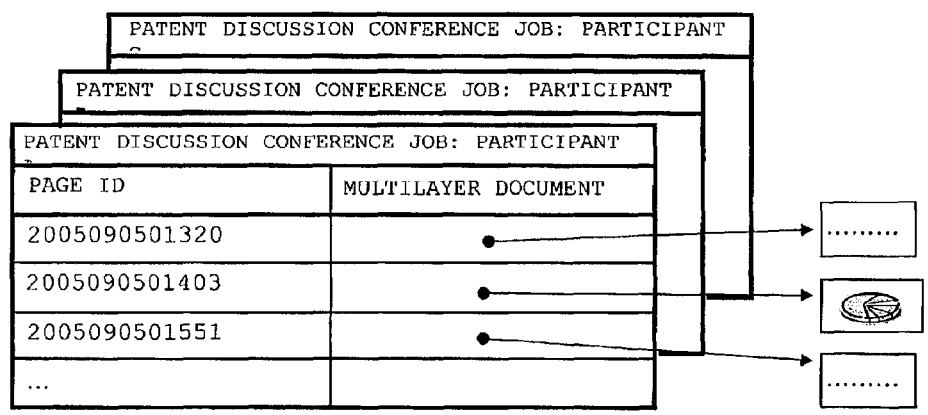
FIG. 16 is an image diagram to which a searchable page ID is assigned to each page of the multilayer document.

FIG. 16 shows an example data structure of the multilayer document according to the exemplary embodiment. FIG. 16 illustrates the relationship between the multilayer document pages and page IDs associated with the document server 22, a conference job managed by the authentication server 29, and the participants. In FIG. 16, "patent discussion conference job" denotes the conference job. With respect to each of the participants (A, B, and C) of the conference, the multilayer document pages are correlated using link information. The multilayer document pages (indicated by arrows in the FIG. 16) denoted by the link information are temporarily stored in the document storage unit, and managed in the document server 22 in the form of the illustrated data structure.

As such, the written memos are not managed in the form of individual shared 53 and personal 52 overwrite layers. Instead, as shown in FIG. 16, a searchable page ID is assigned to each page of the multilayer document to which a job name and participant information are added, and the assigned IDs are used as the link information for managing data for the respective pages for the respective participants. According to this management method, access management for each page is facilitated, and security can be ensured by means of the page ID including the job name as well as authentication information.

FIG. 17 shows, as an example, a specific data list of the multilayer document for "participant A" concerning the "patent discussion conference job", indicating information selected by the page selector 63 and the overwrite layer selector 65.

In FIG. 17, "W" (write) denotes that there exists an image or written memo, and "M" (mark) denotes that the information is selected. In the table, the halftone cells denote that data corresponding to those cells are determined as substantial writing inputs by the pre-selector 67.

The processing flow for making inputs into the data list is next described referring to FIG. 17. The memos written by the memo write units 54, 68 are inserted in the shared overwrite layer 53, the first personal overwrite layer 52, and the second personal overwrite layer 52 (as shown by "W" in FIG. 17).

For example, the first page ID in FIG. 17 "2005090501320" includes data in the "original document", "shared overwrite layer", "first personal overwrite layer", and "second personal overwrite layer" ("W" is marked in the corresponding cells). Because "M" denoting selection is indicated in the cell for the "shared overwrite layer" surrounded by a dashed line, "M" is also indicated in the cell for the "original document" (similarly surrounded by a dashed line).

Subsequently, the image compiler 56 compiles pages having "W" and "M" in an overwrite layer, so as to generate compiled pages. The "compiled page" field in FIG. 17 shows the serial numbering (1-4) of the generated compiled pages.

The flow of specific processing performed by the conference system 100 is described below referring to the flowcharts of FIGS. 6-12 and the screen images of FIGS. 13-14 which are displayed during the processing. The flowcharts can be categorized into three categories of main processing, sub routine processing, and processing called from sub routine processing.

Figure 6:
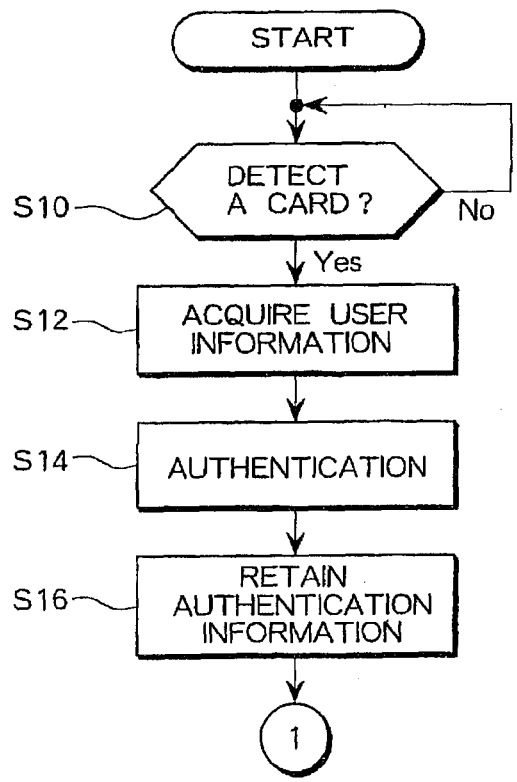
FIG. 6 is a flowchart showing the main processing of the conference sub terminal according to the exemplary embodiment.
Figure 7:
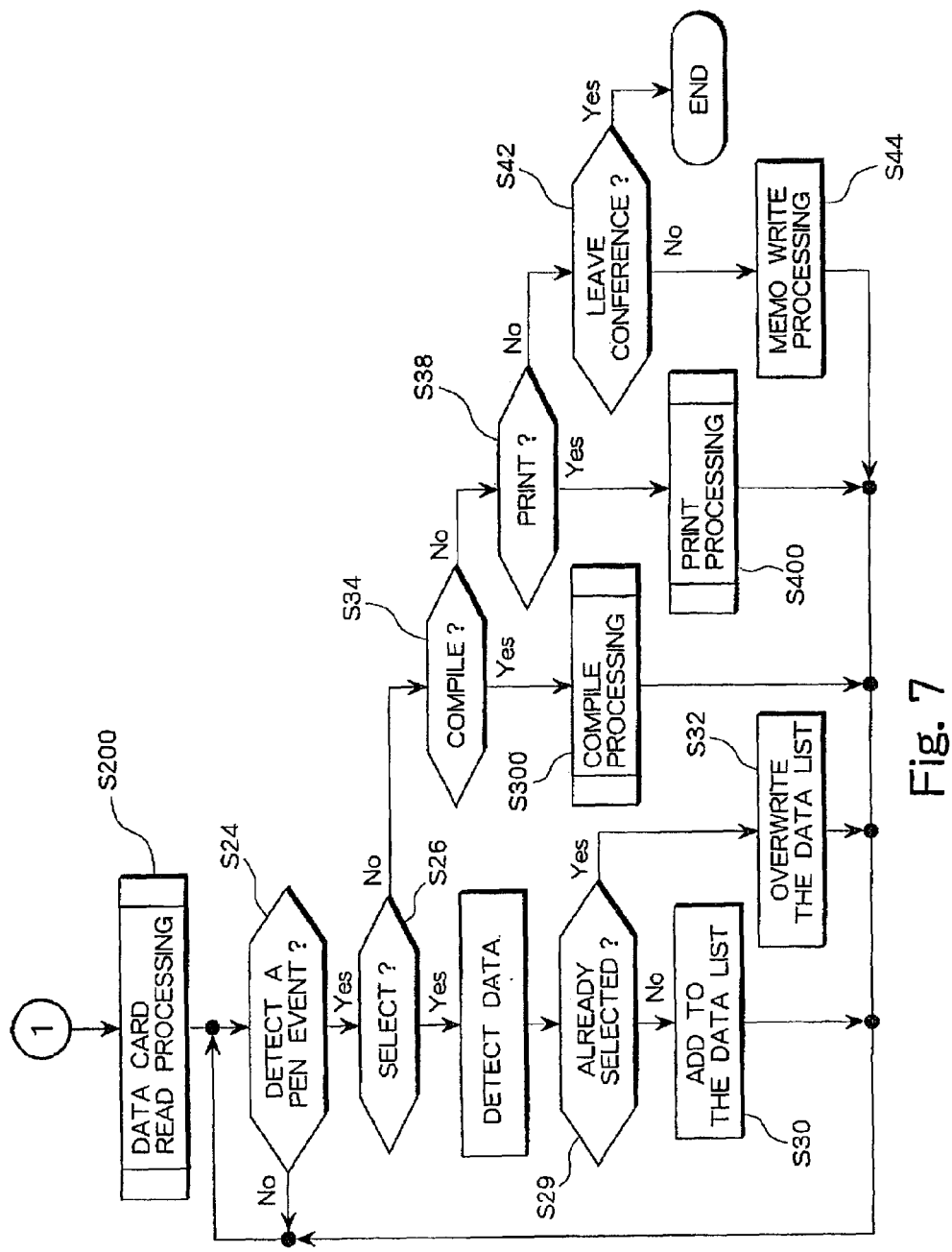
FIG. 7 is another flowchart showing the main processing of the conference sub terminal according to the exemplary embodiment.

The first category includes the main processing related to user authentication shown in FIG. 6, and all other main processing shown in FIG. 7. The second category includes processing such as data card read processing, compile processing, and print processing shown in FIGS. 8-10. The third category includes processing called from a sub routine, such as job name generation processing and data card store processing.

Figure 13:
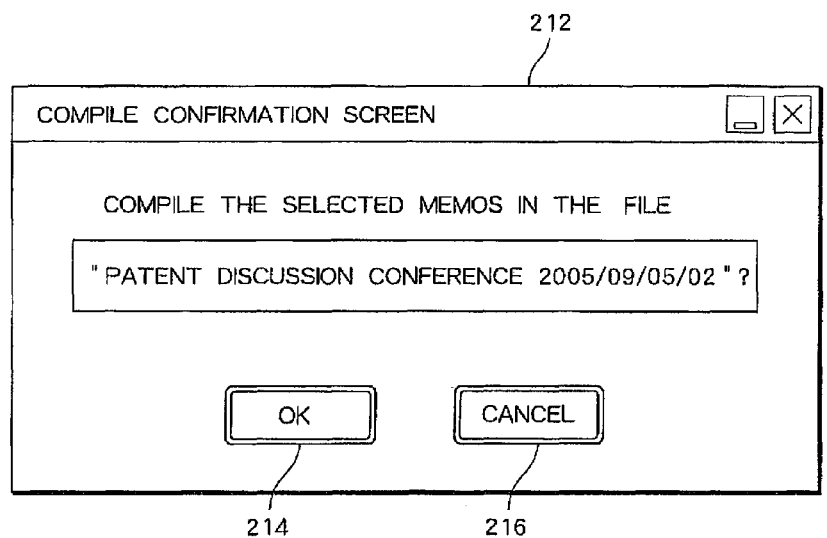
FIG. 13 is an image diagram showing a confirmation screen used during the compile processing of the conference sub terminal according to the exemplary embodiment.
Figure 14:
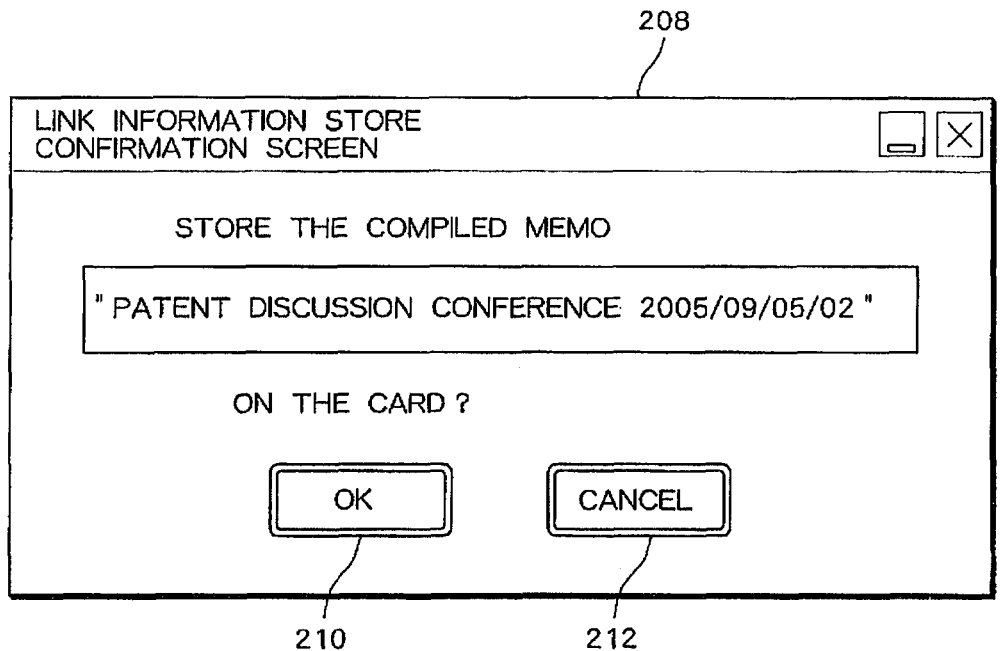
FIG. 14 is an image diagram showing a confirmation screen used during a processing of storing link information performed by the conference sub terminal according to the exemplary embodiment.
Figure 15:
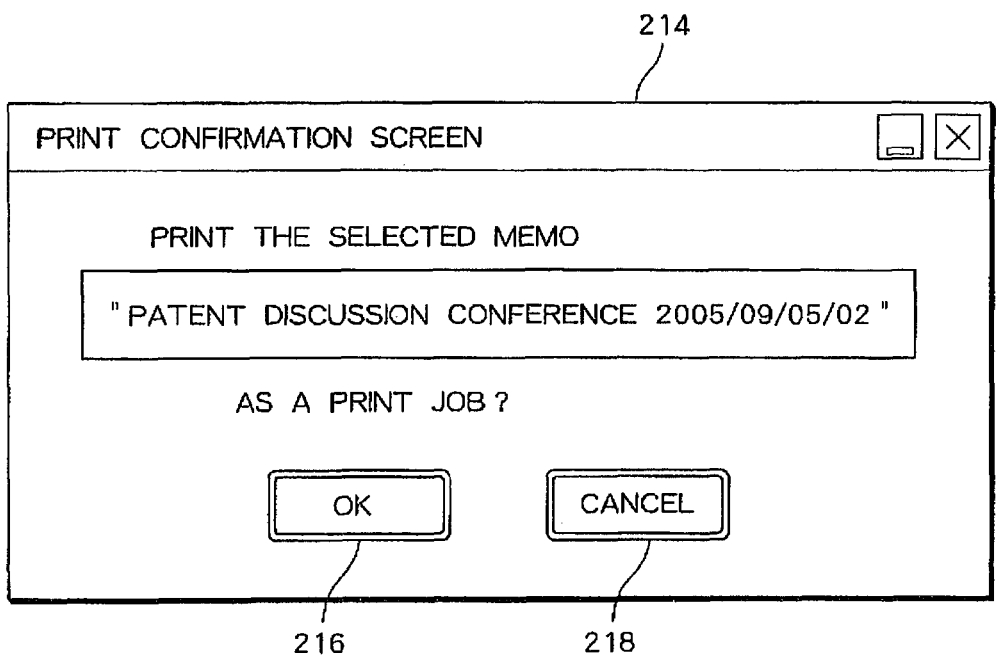
FIG. 15 is an image diagram showing a confirmation screen used during the print processing of the conference sub terminal according the exemplary embodiment.

FIG. 13 shows an image of a compile confirmation screen, FIG. 14 shows an image of a link information store confirmation screen, and FIG. 15 shows an image of a print confirmation screen. These screens are shown on the sub terminal 16.

The processing flow is next described in sequence starting from FIG. 6 showing the main processing for user authentication. Before the conference begins, each of the presenter and other participants holds his IC card over his corresponding terminal in order to be authenticated. At this point, each terminal detects the IC card (step S10), and acquires user information from the authentication server 29 (step S12).

Based on the acquired user information, each terminal performs authentication (step S14), and retains the authentication information until the end of the conference (step S16). The retained authentication information is used in permitting processing described below. After completion of the user authentication, the main processing proceeds to the steps shown in FIG. 7.

FIG. 7 shows all the main processing other than the user authentication. The presenter holds over the IC card reader/writer 14 a data card for reading out a document to be presented. The main terminal 10 then performs the data card read processing sub routine (step S200) shown in FIG. 7 so as to read link information from the data card and to cause the desired document to be displayed on the main terminal 10 and the sub terminals 16.

The data card is an IC card having stored therein link information (such as management information) of an electronic document. By using this data card, data search operations become unnecessary, facilitating display of a document.

Figure 8:
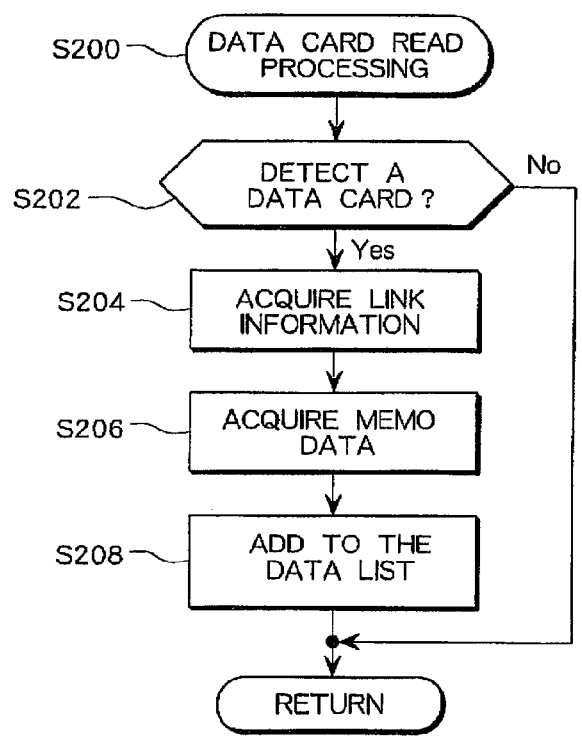
FIG. 8 is a flowchart showing data card read (subroutine) processing of the conference sub terminal according to the exemplary embodiment.

FIG. 8 shows the sub routine (S200) of data card read processing. In the data card read processing, the data card is first detected (step S202), and the link information is acquired from the data card (step S204). For example, the link information "patent discussion conference 2005/09/05/01" stored in the data card is read out, and a corresponding document is acquired from the document server 22 based on this link information.

Based on the acquired document, images are displayed on the main terminal 10 and the sub terminals 16. A participant operating a sub terminal 16 uses the electronic pen 73 to write memos, when necessary, with respect to an image displayed on the sub terminal while listening to and viewing the presentation by the presenter.

The sub terminal 16 acquires the written memo data in step S206 of FIG. 8, and performs processing for adding information to the data list shown in Table 2 (step S208). The steps of acquiring written memo data and making additions to the data list are continuously executed. This sub routine is thereby completed, and the processing returns to the main processing of FIG. 7.

During the conference, the memo data written by a participant are recorded in the document storage unit 50 by the above-described memo data acquisition step (step S206) and the step of adding to the data list (step S208). The memos written by the presenter are similarly recorded.

After the end of the conference, in order to select desired images to be compiled, a participant uses the electronic pen 73 to click a page selection check box 91 shown in FIG. 4 so as to place a checkmark indicating "selection".

In step S24 of the main processing shown in FIG. 7, the sub terminal 16 detects the click (pen event) in the page selection check box 91 in the thumbnail display area 90. When a checkmark indicating "selection" is detected in step S26, the sub terminal 16 searches in the data list to detect written memo data for the page having the checkmark in the page selection check box 91 (step S28), and checks whether the data are already written in the data list (step S29).

When no written memo data are found in the data list, the data are added to the data list (step S30). If the memo data are found in the data list, the detected memo data are deleted from the data list and the latest memo data are written in (step S32). This series of processing ends here and returns to step S24 so as to repeat the processing.

After completion of image selection, a participant may execute compile processing in order to obtain a compiled image. For example, when the participant executes "compile" by clicking the compile button 76 in FIG. 3 using the electronic pen 73, the sub terminal 16 detects the click on the compile button 76 (steps S24-S34 in FIG. 7), and carries out the compile processing sub routine denoted by step S300.

When the sub routine (step S300) of compile processing is executed, the sub terminal 16 acquires memo data marked with "M" from the data list shown in Table 2 (step S302). Subsequently, in step S304, an image is compiled based on the acquired original document pages and their memo data. The sub terminal 16 then carries out step S404 for generating a new job name. Step S404 corresponds to a job name generation sub routine.

Figure 11:
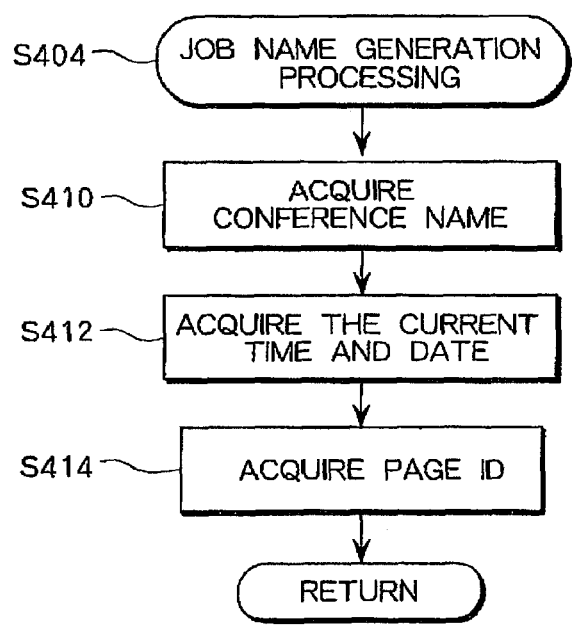
FIG. 11 is a flowchart showing job name generating (subroutine) processing of the conference sub terminal according to the exemplary embodiment.

FIG. 11 shows the job name generation processing (step S404). The sub terminal 16 acquires the conference name "patent discussion conference" from the document server 22 (step S410). Subsequently, the sub terminal 16 acquires the current time and date "2005/09/05" from the document server 22 (step S412). Further, the sub terminal 16 acquires the page ID of the first page "200509051320" from the document server 22 (step S414). Based on the acquired information, a new job name is imparted and used for managing the compiled pages. This sub routine is ended after step S414, and the processing returns to the compile processing sub routine of FIG. 9.

Figure 9:
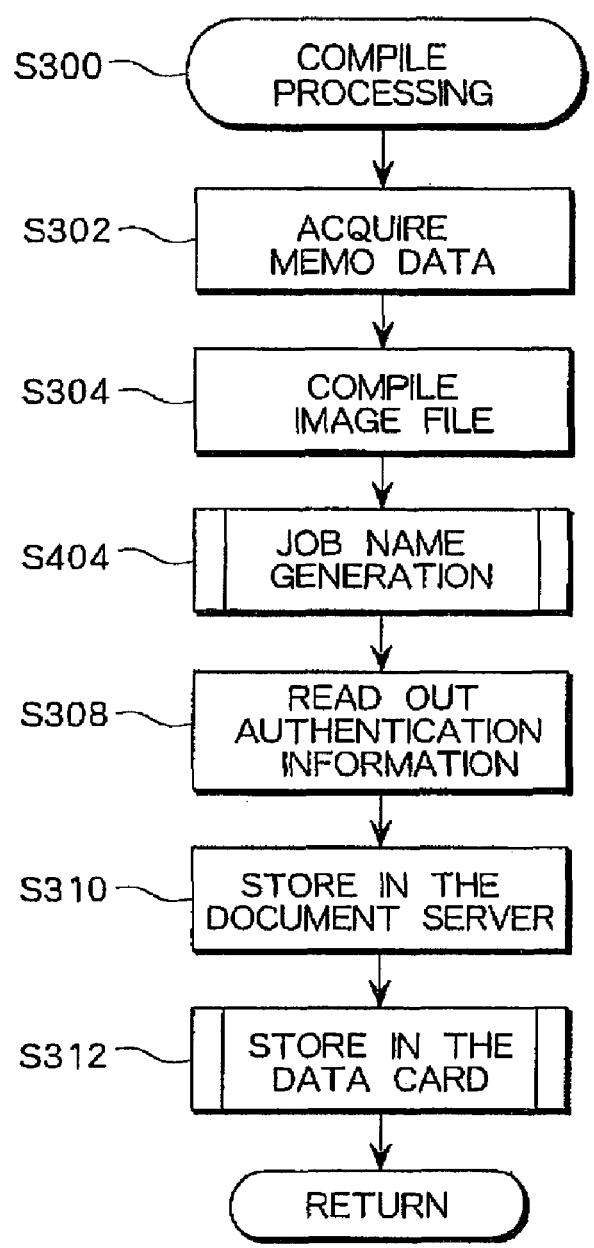
FIG. 9 is a flowchart showing compile (subroutine) processing of the conference sub terminal according to the exemplary embodiment.

In step S308 of FIG. 9, the sub terminal 16 uses the acquired new job name and the retained authentication information to obtain confirmation from the participant concerning storing of compiled data into the document server 22. FIG. 13 shows a compile confirmation screen 202 presenting the new job name "patent discussion conference 2005/09/05/02" to the participant in order to obtain his confirmation. The participant clicks the OK button 204 when he wishes to proceed with the compile processing, and clicks the cancel button 206 when he wishes to cancel.

When the sub terminal 16 detects the click on the OK button 204, step S310 of FIG. 9 is performed to store the compiled electronic document into the document server 22. Subsequently, in step S312, link information of the compiled electronic document is stored on the data card. Step S312 corresponds to the sub routine of data card store processing, which is shown in detail in FIG. 12.

Figure 12:
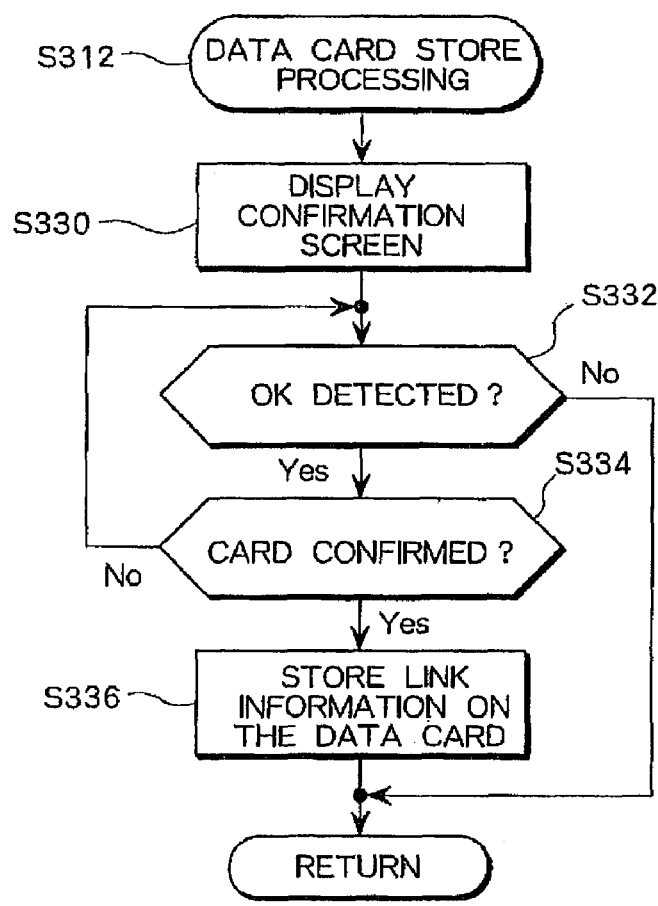
FIG. 12 is a flowchart showing data card record (subroutine) processing of the conference sub terminal according to the exemplary embodiment.

In step S330 of FIG. 12, the sub terminal 16 obtains confirmation from the participant concerning the link information. FIG. 14 shows a link information store confirmation screen 208 presenting a screen image for obtaining confirmation from the participant concerning storing of the link information for "patent discussion conference 2005/09/05/02" on the data card. When the OK button 210 is clicked in step S332, the data card is confirmed in step S334. When the data card is confirmed, the link information is stored on the data card in step S336. The compile processing sub routine is thereby completed, and the processing returns to the main processing shown in FIG. 7.

When the sub terminal 16 detects a click on the cancel button 212 in step S332, the data card store processing is ended at that point, and the processing returns to the main processing shown in FIG. 7. When the compile processing S300 is ended, the processing returns to the pen event detection of step S24.

For example, when the participant clicks the print button 75 shown in FIG. 3 to execute "print" processing after completion of the compile processing, the sub terminal 16 detects the click on the print button 75 (step S38), and carries out the print processing sub routine S400.

Figure 10:
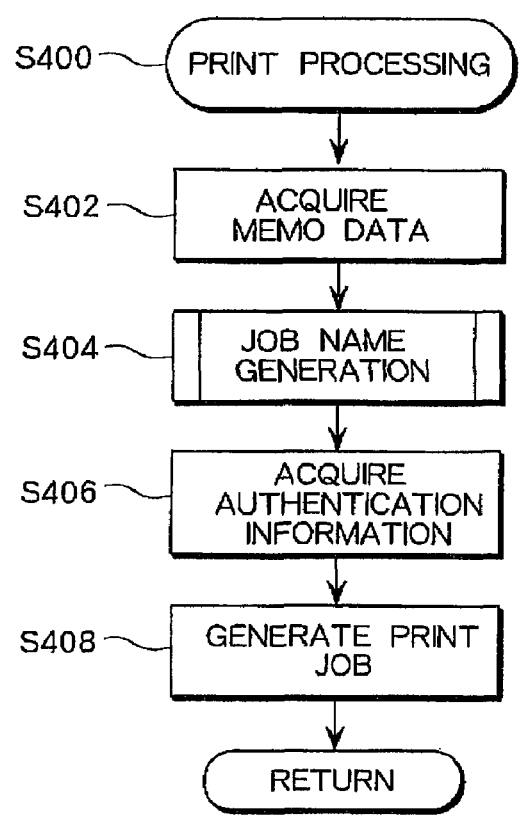
FIG. 10 is a flowchart showing print (subroutine) processing of the conference sub terminal according to the exemplary embodiment.

In step S402 of the print processing shown in FIG. 10, the sub terminal 16 acquires necessary written memo data from the document server 22, and generates a job name in step S404. Subsequently, in step S406, the sub terminal 16 reads out the authentication information in order to record a print history record. Next, in step S408, a print job is generated, and the job is output at the printer 28 via the print server 26. The print processing is thereby completed, and the processing returns to the main processing shown in FIG. 7. For security management purposes, print history including the job name of the print processing is recorded in the authentication server 29.

After completion of the print processing S400 shown in FIG. 7, the processing returns to the pen event detection of step S24. For example, when the participant clicks the "leave" button 82 after the end of the conference, the sub terminal 16 determines in step S42 that the participant left the conference, and ends the processing. When the ending of the conference is cancelled, step S44 is carried out to continue the memo write processing. Further, when the participant wishes to erase personal memos that he wrote, the personal memos can be erased by clicking the clear button 84.

As described above, by employing the exemplary embodiment, it is possible to compile the desired pages and memos from among the reference document used in a conference to thereby reduce the number of pages, such that printout, mail transmission, and storing of a file can be facilitated. It should be noted that the above-described processing can be similarly performed using devices other than the electronic pen input type sub terminal 16, such as the desktop PC 32 and other PCs.

According to the above-described exemplary embodiment, as it is further possible to individually store and select a plurality of memo data within the personal overwrite layer data, the operations for determining compile settings can be facilitated when the participant writes memos while noting the parties to whom the participant wishes to convey information.

While an example combination of layers for writing personal memos and an example of providing two separate memo data in the personal overwrite layer 52 are described according to the exemplary embodiment, the present invention is not limited to such arrangements. Further, while the above-described exemplary embodiment employs the selection receiver 69 for receiving participant's selections of memos according to which pages are compiled, the present invention is not limited by this feature. For example, all overwrite layers including memos may be extracted as the pages to be compiled.

While the processing for selecting and compiling the written memos is described as being performed after the end of the conference in the above-described exemplary embodiment, the selecting and compiling processing may alternatively be performed during the conference.

While the electronic document according to the above-described exemplary embodiment includes the shared overwrite layer data and the personal overwrite layer data in addition to the image data of the original document, the overwrite layer data may not be provided, and the information written by the presenter or other participants may be treated as integral image data together with the image data of the original document.

The foregoing description of the embodiments of the present invention have been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A conference system comprising:
   a terminal to display a document presented by a presenter in a conference and to receive participant inputted information from a participant of the conference for enabling an exchange of opinions between participants; and
   a document storage unit to store the document being presented by the presenter and the participant inputted information;
   said document storage unit storing image data for each respective page of the document being presented by the presenter;
   said document storage unit storing shared overwrite data provided for each page, the shared overwrite data including shared presenter inputted memos or shared participant inputted memos;
   said document storage unit storing personal overwrite data for each participant provided for each page, the personal overwrite data including personal memos inputted by the participant, said personal overwrite data being associated with a specific terminal;
   said terminal including,
      a pre-selection unit to determine if a data size of a shared participant inputted memo is greater than a predetermined value,
      said pre-selection unit determining if a data size of a personal memo is greater than the predetermined value,
      a read unit to read out from said document storage unit image data corresponding to each page of the document being presented by the presenter,
      said read unit selectively reading image data corresponding to shared participant inputted memos being determined by said pre-selection unit to be greater than the predetermined value,
      said read unit selectively reading image data corresponding to personal memos being determined by said pre-selection unit to be greater than the predetermined value,
      a display controller to display a list identifying the shared participant inputted memos and personal memos selectively read out by said read unit, a selection unit to enable a participant to individually select the listed shared participant inputted memos and personal memos, and an image compiler that compiles, for each page, the image data corresponding to the selected shared participant inputted memos and the image data corresponding to the selected personal memos together with the image data of the document to create a compiled page for each page.

2. A conference terminal that displays a document presented by a presenter in a conference and that is capable of receiving inputs from a participant of the conference for enabling an exchange of opinions between participants, the conference terminal comprising:

a communication unit to communicate with a document storage unit that stores image data for each respective pages of the document being presented by the presenter, shared overwrite data provided for each page, the shared overwrite data including shared presenter inputted information or shared participant memos, and personal overwrite data for each participant provided for each page, the personal overwrite data including personal memos inputted by the participant, said personal overwrite data being associated with a specific conference terminal;

a pre-selection unit to determine if a data size of a shared participant inputted memo is greater than a predetermined value, said pre-selection unit determining if a data size of a personal memo is greater than the predetermined value;

a read unit to read out from said document storage unit image data corresponding to each page of the document being presented by the presenter, said read unit selectively reading image data corresponding to shared participant inputted memos being determined by said pre-selection unit to be greater than the predetermined value, said read unit selectively reading image data corresponding to personal memos being determined by said pre-selection unit to be greater than the predetermined value;

a display controller to display a list identifying the shared participant inputted memos and personal memos selectively read out by said read unit;

a selection unit to enable a participant to individually select the listed shared participant inputted memos and personal memos; and an image compiler that compiles, for each page, the image data corresponding to the selected shared participant inputted memos and the image data corresponding to the selected personal memos together with the image data of the document to create a compiled page for each page.

3. A computer readable medium storing a program causing a computer to execute a process for controlling a conference terminal that displays a document presented by a presenter in a conference and is capable of receiving inputs from a participant of the conference for enabling an exchange of opinions between participants, the process comprising:

communicating with a document storage unit image data for each respective page of the document being presented by the presenter, shared overwrite data provided for each page, shared overwrite data provided for each page, the shared overwrite data including shared presenter inputted information or shared participant memos, and personal overwrite data for each participant provided for each page, the personal overwrite data including personal memos inputted by the participant, the personal overwrite data being associated with a specific conference terminal;

determining if a data size of a shared participant inputted memo is greater than a predetermined value;

determining if a data size of a personal memo is greater than the predetermined value;

reading out from the document storage unit image data corresponding to each page of the document being presented by the presenter;

selectively reading image data corresponding to shared participant inputted memos being determined to be greater than the predetermined value;

selectively reading image data corresponding to personal memos being determined to be greater than the predetermined value;

displaying a list identifying the shared participant inputted memos and personal memos selectively read out by said read unit;

enabling a participant to individually select the listed shared participant inputted memos and personal memos; and compiling, for each page, the image data corresponding to the selected shared participant inputted memos and the image data corresponding to the selected personal memos together with the image data of the document to create a compiled page for each page.

4. A conference system control method comprising:

controlling a terminal that displays a document presented by a presenter in a conference, the terminal being capable of receiving input information from a participant of the conference for enabling an exchange of opinions between participants;

storing image data of respective pages of the document presented by the presenter in the conference, shared overwrite data provided for each page, the shared overwrite data including shared presenter inputted information or shared participant memos, and personal overwrite data for each participant provided for each page, the personal overwrite data including personal memos inputted by the participant, the personal overwrite data being associated with a specific conference terminal;

determining if a data size of a shared participant inputted memo is greater than a predetermined value;

determining if a data size of a personal memo is greater than the predetermined value;

reading out from the document storage unit image data corresponding to each page of the document being presented by the presenter;

selectively reading image data corresponding to shared participant inputted memos being determined to be greater than the predetermined value;

selectively reading image data corresponding to personal memos being determined to be greater than the predetermined value;

displaying a list identifying the shared participant inputted memos and personal memos selectively read out by said read unit;

enabling a participant to individually select the listed shared participant inputted memos and personal memos; and compiling, for each page, the image data corresponding to the selected shared participant inputted memos and the image data corresponding to the selected personal memos together with the image data of the document to create a compiled page for each page.

* * * * *